United States Patent [19]
Solomon

[11] Patent Number: 6,064,823
[45] Date of Patent: May 16, 2000

[54] CAMERA HOUSING WITH INTEGRAL CARRY STRAP RETAINER

[75] Inventor: Jeffrey A. Solomon, Spencerport, N.Y.

[73] Assignee: Eastman Kodak Company, Rochester, N.Y.

[21] Appl. No.: 09/273,016

[22] Filed: Mar. 19, 1999

[51] Int. Cl.$^7$ .................................................. G03B 17/24
[52] U.S. Cl. .............................................. 396/6; 396/423
[58] Field of Search ........................................ 396/6, 423

[56] References Cited

U.S. PATENT DOCUMENTS 4,348,095  9/1982  Suzuki et al. ........................... 396/423
5,218,390  6/1993  Swayze ................................... 396/423

Primary Examiner—David M. Gray
Attorney, Agent, or Firm—Roger A. Fields

[57] ABSTRACT

A camera housing comprising a front cover part and a rear cover part, is characterized in that the front cover part and the rear cover part have respective similar ends that are uniformly curved to be contoured in similar non-varying curves and have respective concavities that extend inward at the similar ends to define a concave surface common to the ends, and the end of at least one of the front and rear cover parts continues over the concavity at that end, in contour with the non-varying curves, to form a carry strap retainer which, with the single concave surface, defines a pass-through opening for an elongate carry strap.

5 Claims, 7 Drawing Sheets

CAMERA HOUSING WITH INTEGRAL CARRY STRAP RETAINER

FIELD OF THE INVENTION

The invention relates generally to the field of photography, and in particular to cameras such as a one-time-use camera. More specifically, the invention relates to a camera housing with an integral carry strap retainer.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed film roll prewound from the film cartridge onto a film take-up spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

One-time-use cameras typically do not include any carry strap such as a wrist strap.

Prior Art Problem

Since the one-time-use camera is relatively small, it is advantageous to connect a carry strap such as a wrist strap to the camera in order to facilitate holding the camera. However, known retainers which secure various carry straps to cameras typically protrude from one end of the camera. This, effectively, adds to the size of the camera by creating a protuberance at the end of the camera.

SUMMARY OF THE INVENTION

According to the invention, an exterior cover part of a camera housing is characterized in that it has:

one end that is uniformly curved to be contoured in a single non-varying curve;

a carry strap; and a pass-through opening in the end, for the carry strap, that leaves an elongate portion of the end over the opening contoured in the non-varying curve to serve as a retainer for the carry strap which does not protrude from the end.

More specifically, a camera housing comprising a front cover part and a rear cover part is characterized in that:

the front cover part and the rear cover part have respective similar ends that are uniformly curved to be contoured in similar non-varying curves and have respective concavities that extend inward at the similar ends to define a concave surface common to the ends; and the end of at least one of the front and rear cover parts continues over the concavity at that end, in contour with the non-varying curves, to form a carry strap retainer which, with the single concave surface, defines a pass-through opening for an elongate carry strap.

DETAILED DESCRIPTION OF THE INVENTION

Figure 1:
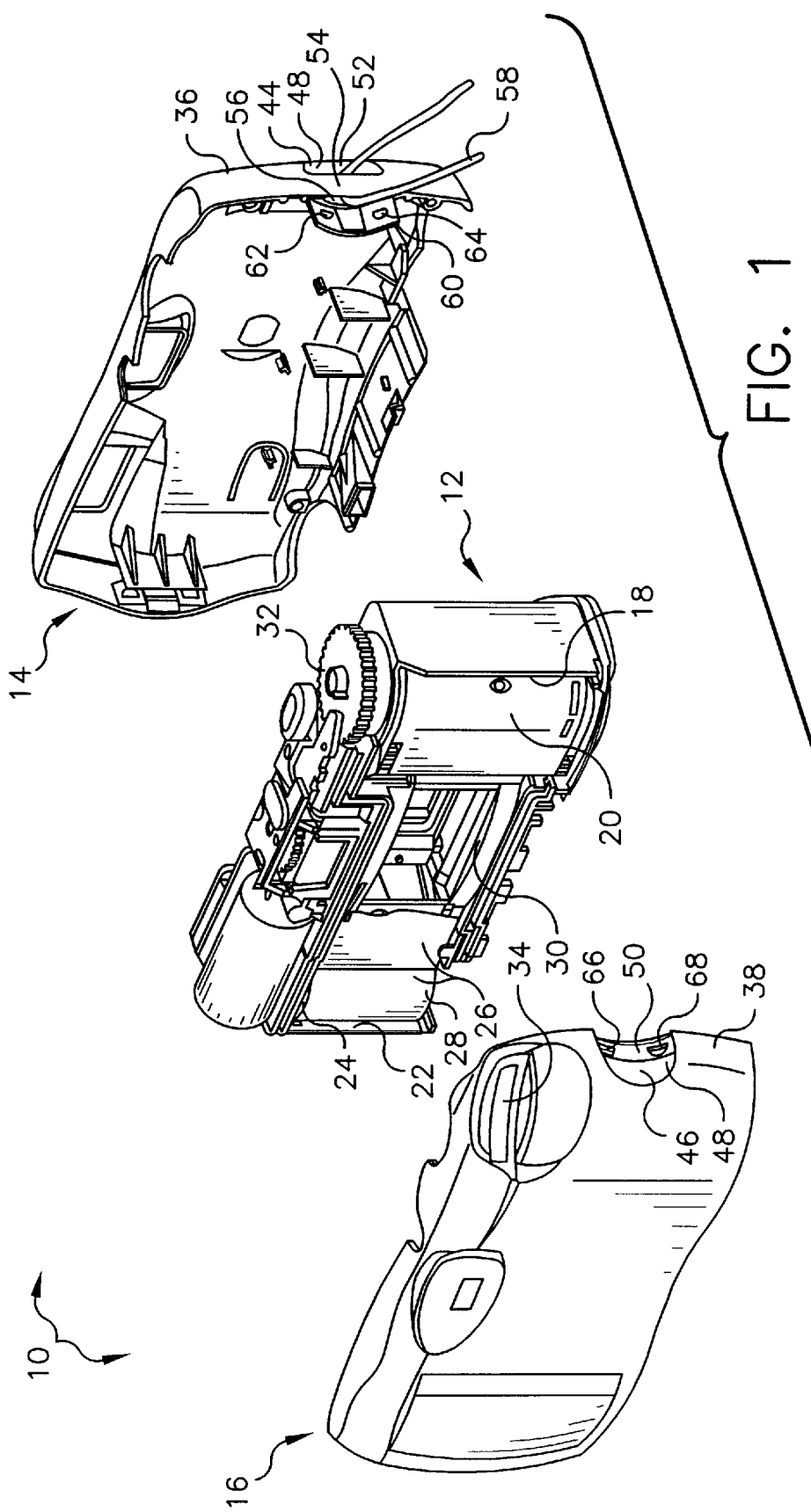
FIG. 1 is a rear exploded perspective view of a one-time-use camera which is a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–7 show a one-time-use camera 10 which includes a plastic opaque main body part 12 and a pair of plastic opaque front and rear cover parts 14 and 16 which are adapted to contain the main body part between them. The front and rear cover parts 14 an 16 when connected to one another form a compact camera housing for the main body part 12.

As is known, the main body part 12 has a rearwardly open cartridge receiving chamber 18 for a conventional film cartridge 20 and a rearwardly open film supply chamber 22 for a rotatably supported film supply spool 24. During manufacture, a filmstrip 26 is prewound into an unexposed film roll 28 on the film supply spool 24. See FIG. 1. A rearwardly open backframe opening 30 is located between the cartridge receiving chamber 18 and the film supply chamber 22 for exposing successive imaging sections (frames) of the filmstrip 26.

A film winding thumbwheel 32 rotatably supported on the main body part 12 protrudes outwardly from a slot 34 in the rear cover part 16 and has a depending coaxial stem in coaxial engagement with an exposed top end of a film spool inside the film cartridge 20. See FIG. 1. Manual winding rotation of the film winding thumbwheel 32 counter-clockwise in FIG. 1 similarly rotates the film spool inside the film cartridge 20 to wind each exposed imaging section of the filmstrip 26 into the film cartridge and to advance an unexposed imaging section of the filmstrip from the unexposed film roll 28 to the backframe opening 30.

Figure 2:
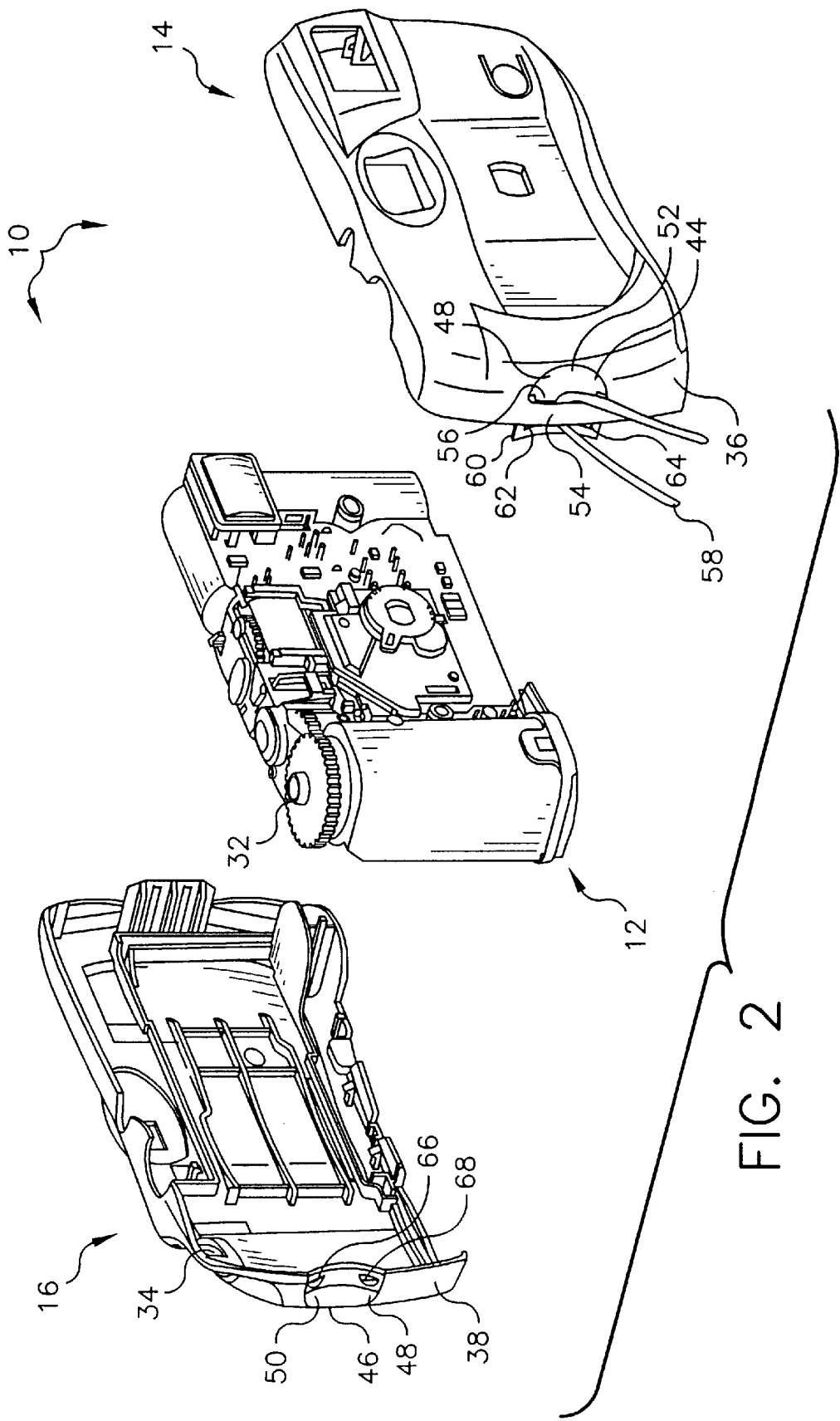
FIG. 2 is a front exploded perspective view of the one-time-use camera.
Figure 3:
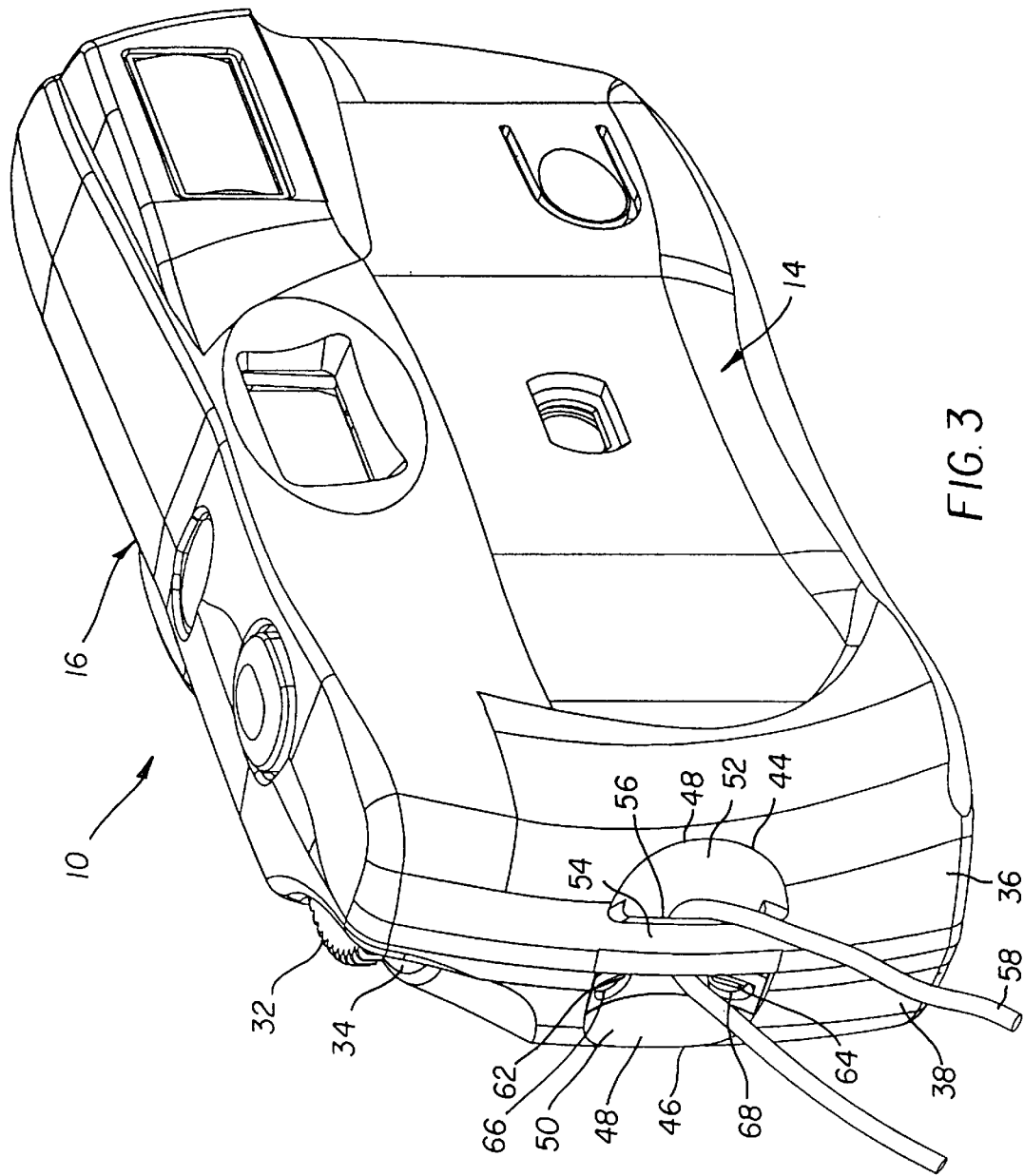
FIG. 3 is a front-perspective view of the assembled camera.
Figure 6:
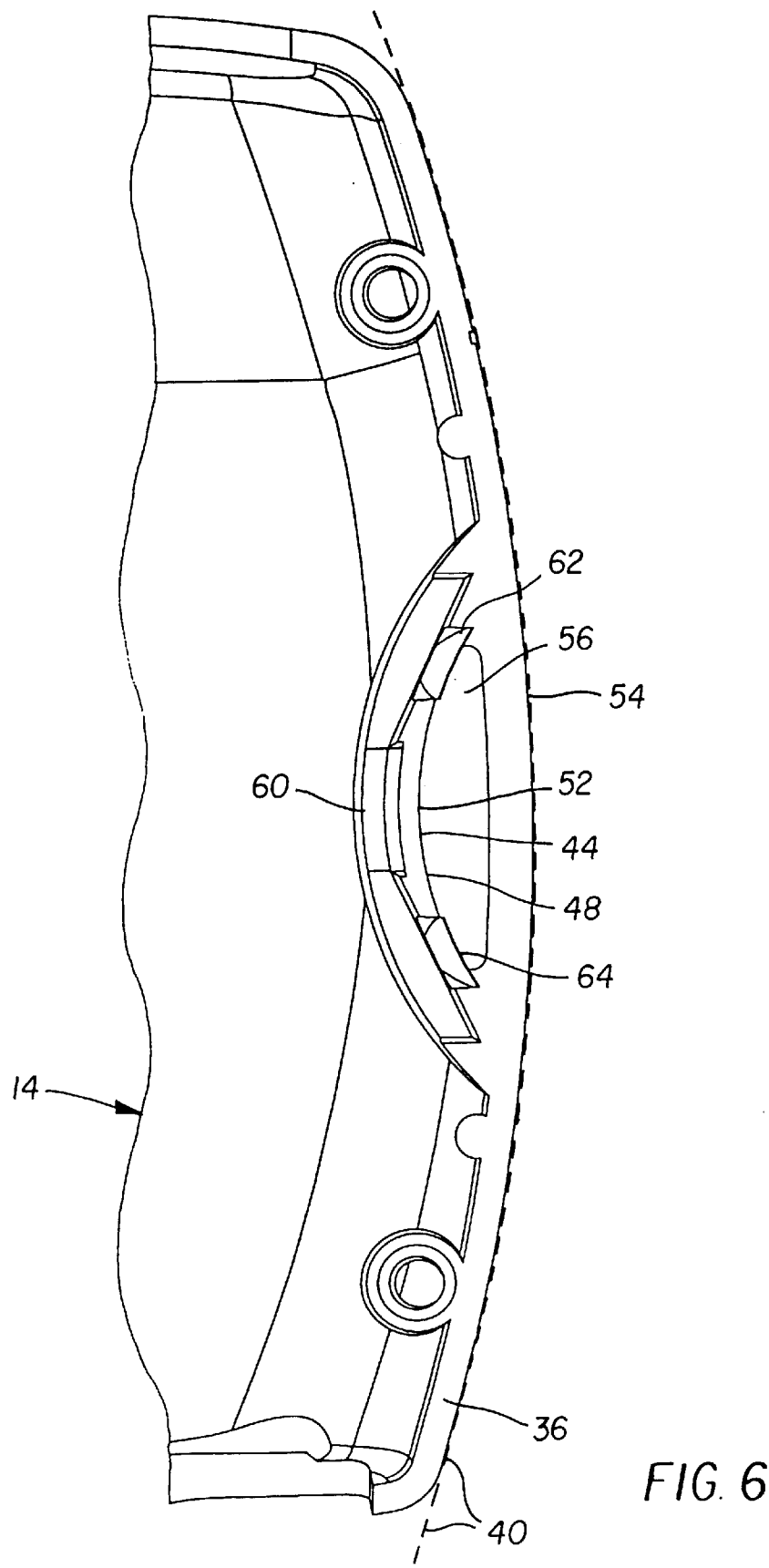
FIG. 6 is an elevation view of one end of a front cover part of the one-time-use camera.
Figure 7:
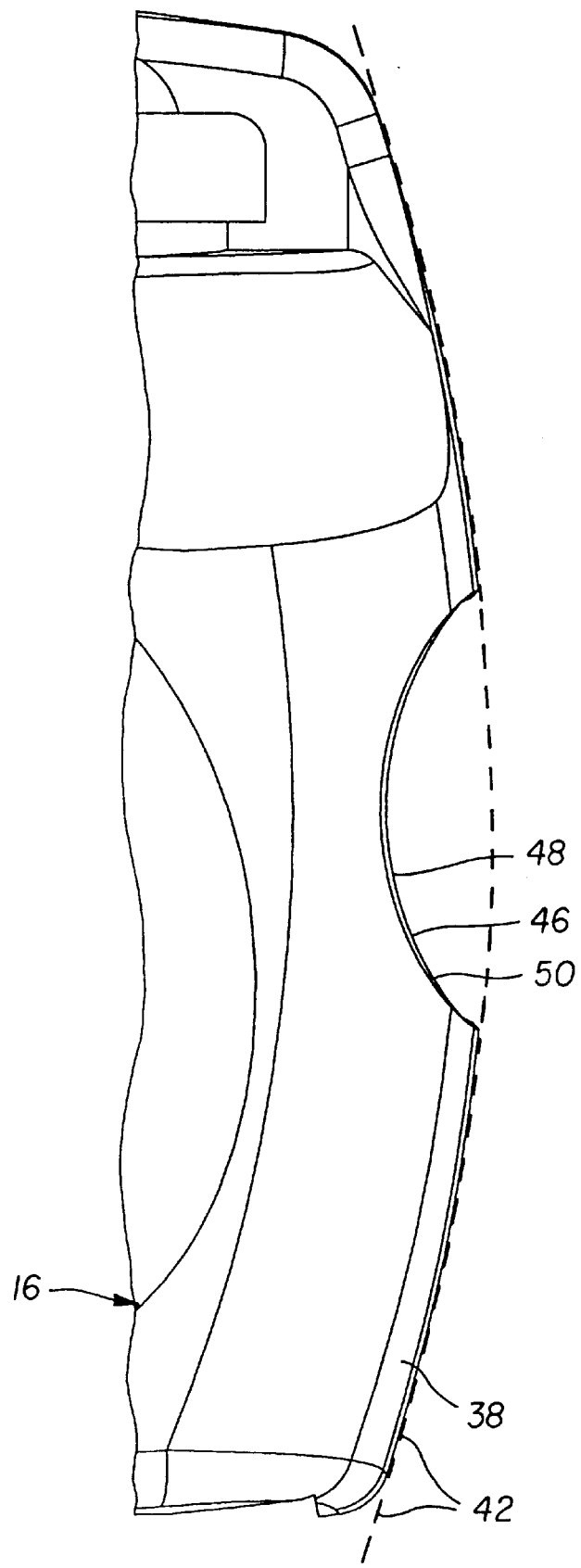
FIG. 7 is an elevation view of one end of a rear cover part of the one-time-use camera

The front cover part 14 and the rear cover part 16 have similar (corresponding) ends 36 and 38, i.e., the right ends of the front and rear cover parts in FIG. 1, the left ends of the front and rear cover parts in FIG. 2, that are each uniformly curved to be contoured in similar non-varying curves 40 and 42. The single non-varying curve 40 that the end 36 of the front cover part 12 is contoured in is depicted in FIG. 6. The single non-varying curve 42 that the end 38 of the rear cover part 16 is contoured in is depicted in FIG. 7.

The front cover part 14 and the rear cover part 16 have respective adjacent concavities 44 and 46 that curve inward at the two ends 36 and 38 to together define a concave surface 48 common to, i.e., belonging to or shared by, both ends. Preferably, the two concavities 46 and 48 are co-planar. One half of the concave surface 48 on the end 38 is a first concave portion 50 and the other half of the concave surface on the end 36 is a second concave portion 52. See FIGS. 3–7.

Figure 4:
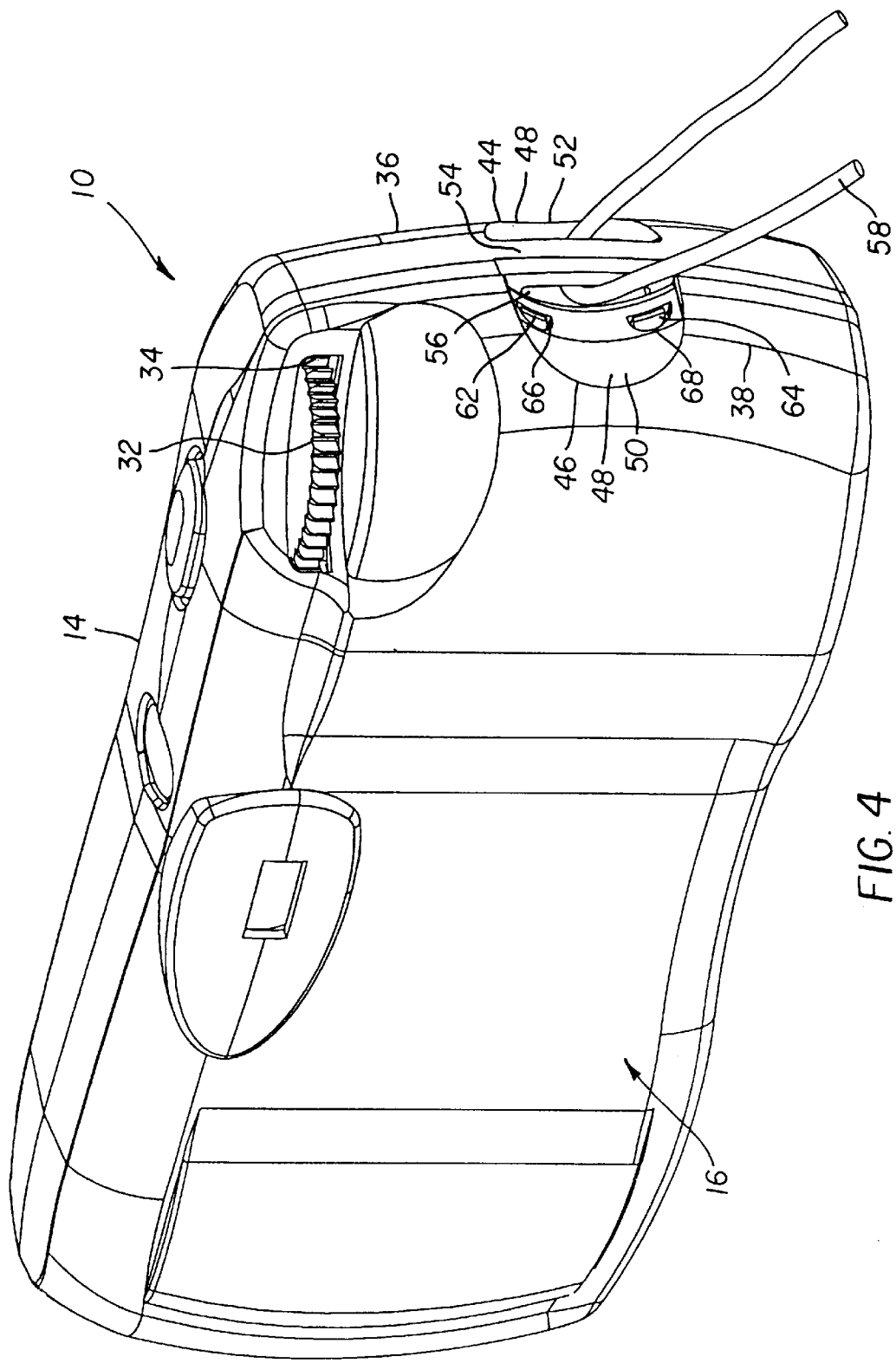
FIG. 4 is a rear-perspective view of the assembled camera.
Figure 5:
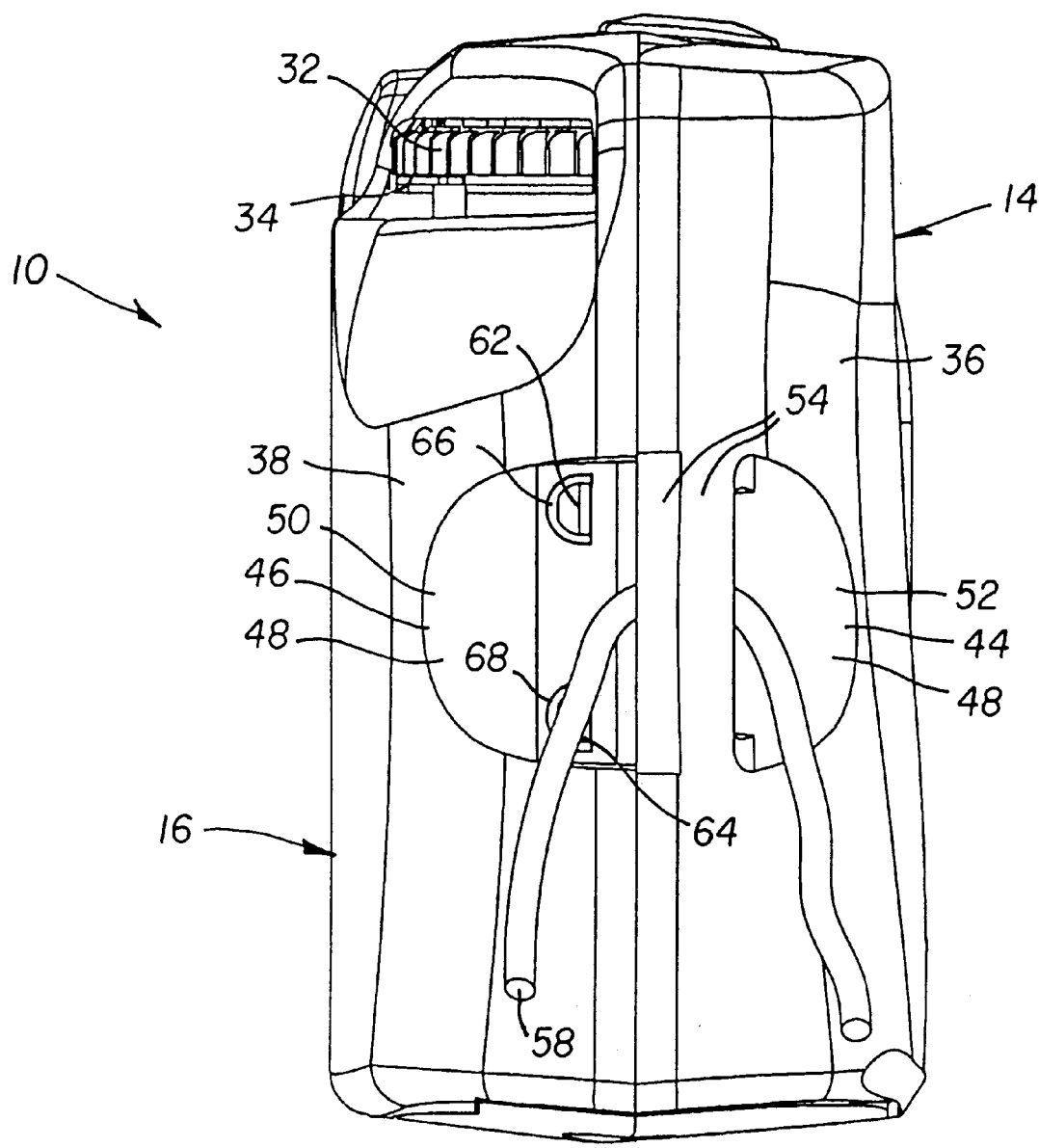
FIG. 5 is an end elevation view of the assembled camera.

The end 36 of the front cover part 14 continues over the concavity 44 in that end as shown in FIGS. 4–6, in contour with the non-varying curve 42 that the end is contoured in, to form an integral carry strap retainer portion 54 of the end. Since the carry strap retainer portion 54 is in contour with (flush with) the non-varying curve 42, i.e., it conforms with the curvature of the end 36, it does not protrude from the end. The carry strap retainer portion 54, with the second concave portion 52 of the concave surface 48, defines a pass-through opening 56 for an elongate carry strap 58.

An extension 60 of the end 36 of the front cover part 14, which is adjacent the second concave portion 52 of the concave surface 48, has two integral projections or hooks 62 and 64. The extension 60 is flexible to permit it to fit beneath the first concave portion 50 of the concave surface 48 when the front are rear cover parts 14 and 16 are assembled as shown in FIGS. 2–5. Respective holes 66 and 68 in the first concave portion 50 receive the projections 62 and 64 to secure the front and rear cover parts 14 and 16 to one another.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. cartridge receiving chamber
20. film cartridge
22. film supply chamber
24. film supply spool
26. filmstrip
28. unexposed film roll
30. backframe opening
32. thumbwheel
34. slot
36. end
38. end
40. non-varying curve
42. non-varying curve
44. concavity
46. concavity
48. concave surface
50. first concave portion
52. second concave portion
54. carry strap retainer portion
56. pass-through opening
58. carry strap
60. extension
62. hook
64. hook
66. hole
68. hole

What is claimed is:

1. A camera housing comprising a front cover part and a rear cover part, is characterized in that:

said front cover part and said rear cover part have respective adjacent concavities that extend inward at similar ends of the front and rear cover parts to define a concave surface common to said ends; and said end of at least one of the front and rear cover parts continues over the concavity at that end to form a carry strap retainer spaced from said concave surface to permit an elongate carry strap to be threaded between said carry strap retainer and said concave surface.

2. A camera housing as recited in claim 1, wherein a first concave portion of said concave surface at said end of one of the front and rear cover parts and an extension adjacent a second concave portion of said concave surface at said end of the other of the front and rear cover parts, which fits beneath said first concave portion, have mating holes and projections to secure the front and rear cover parts together when said extension is placed beneath said first concave portion.

3. A camera housing as recited in claim 2, wherein said extension is flexible to facilitate it being placed beneath said first concave portion.

4. A camera housing comprising a front cover part and a rear cover part, is characterized in that:

said front cover part and said rear cover part have respective similar ends that are uniformly curved to be contoured in similar non-varying curves and have respective concavities that extend inward at said ends to define a concave surface common to said ends; and said end of at least one of the front and rear cover parts continues over the concavity at that end, in contour with said non-varying curves, to form a carry strap retainer which, with said single concave surface, defines a pass-through opening for an elongate carry strap.

5. A camera housing as recited in claim 4, wherein said concavities are co-planar.

* * * * *